United States Patent [19]

Proctor et al.

[11] Patent Number: 4,632,434
[45] Date of Patent: Dec. 30, 1986

[54] COUPLING MEANS FOR TUBULAR MEMBERS

[75] Inventors: Robert H. Proctor, Baltimore; Ronald C. Hardesty, Sykesville, both of Md.

[73] Assignee: Murray Corporation, Cockeysville, Md.

[21] Appl. No.: 752,602

[22] Filed: Jul. 8, 1985

[51] Int. Cl.$^4$ .............................................. F16L 37/00
[52] U.S. Cl. ...................................... 285/39; 285/305; 285/318; 285/347; 285/351
[58] Field of Search ............... 285/308, 318, 351, 174, 285/239, 39

[56] References Cited

U.S. PATENT DOCUMENTS 4,055,359 10/1977 McWethy ............................. 285/39
4,401,326 8/1983 Blair .................................... 285/318

FOREIGN PATENT DOCUMENTS 535092 1/1957 Canada ............................... 285/318
683011 3/1964 Canada ............................... 285/318
1277984 10/1961 France .............................. 285/318

*Primary Examiner*—Cornelius J. Husar
*Assistant Examiner*—Anthony Knight
*Attorney, Agent, or Firm*—Leonard Bloom

[57] ABSTRACT

A quick-disconnect coupling for a pair of telescopic slidable tubular members has an annular garter spring trapped in a spring housing carried by one of the tubular members. The garter spring is adapted to be lodged between a right-angularly disposed flange on the spring housing and an upwardly-inclined annular flange formed on the end of the other tubular member. The respective flanges are arranged transverse to each other. The components of the coupling are formed conveniently and economically, without the necessity for expensive metal-forming dies, and are easily assembled.

1 Claim, 6 Drawing Figures

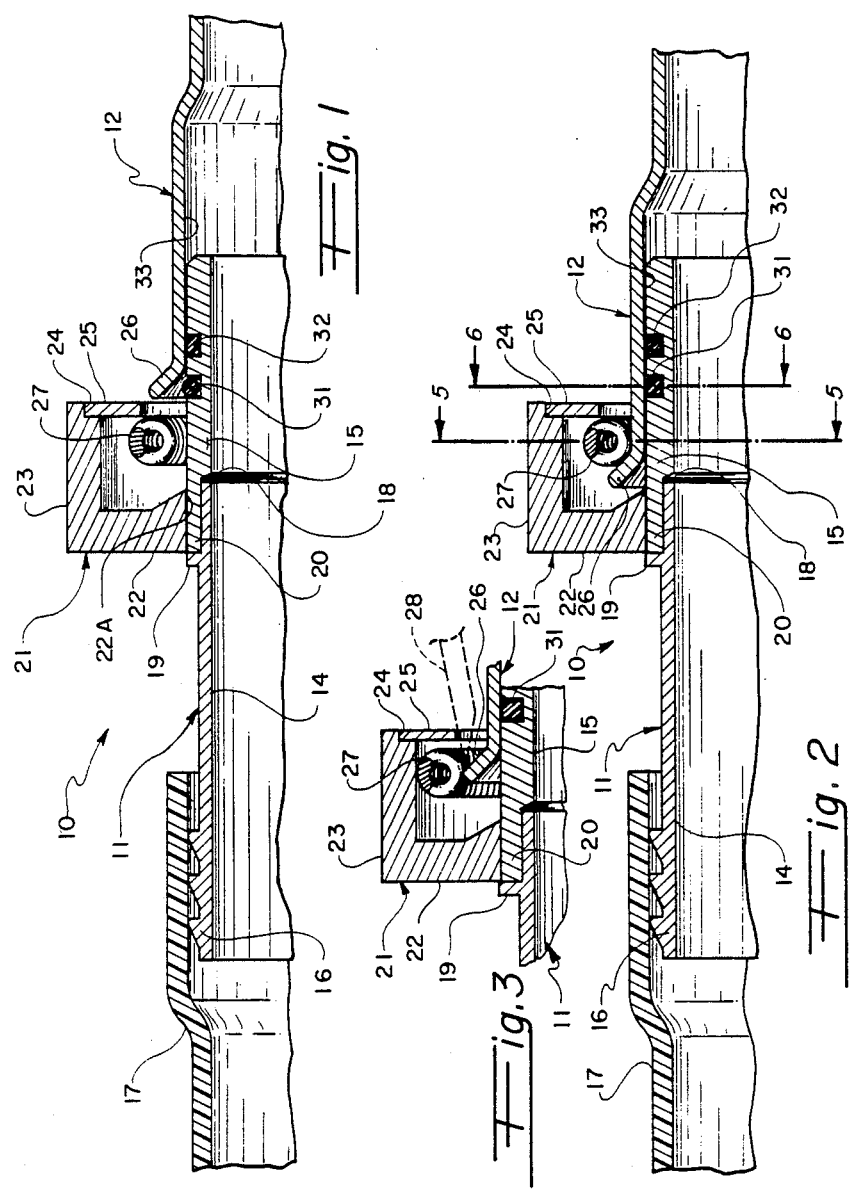

COUPLING MEANS FOR TUBULAR MEMBERS

FIELD OF THE INVENTION

The present invention relates to a coupling means for a pair of telescopically-received tubular members, and more particularly, to a coupling means for quickly connecting (or disconnecting) a pair of tubular members in an automobile air conditioning system.

BACKGROUND OF THE INVENTION

In an automobile, the torque generated by the engine movement may be transmitted to the air conditioning components mounted rigidly to the body of the car, causing either fatigue in the connecting members or loosening of the threaded joints. Accordingly, the coupling means should not transmit the torque, besides providing a quick connect-disconnect feature.

With respect to these automotive couplings, the prior art may be exemplified by the McWethy U.S. Pat. No. 4,055,359 issued on Oct. 25, 1977. In this '359 patent, a garter spring is lodged between a first annular flange on one of the tubular members and a cooperating second annular flange arranged parallel to the first annular flange and formed on a circular housing for the garter spring, the circular housing being formed of bent sheet metal and retained on one of the tubular members.

SUMMARY OF THE INVENTION

It is an object of the present invention to provide a quick-disconnect coupling means which may be made conveniently and economically, and which is rugged and reliable for long-life substantially maintenance-free performance.

It is another object of the present invention to provide an improved coupling means having conveniently-made screw-machined metal parts, thereby obviating the necessity for relatively-expensive special metal-forming dies heretofore resorted to in the prior art.

In accordance with the teachings of the present invention, a coupling means is provided for a pair of tubular members. These members include an inner tubular member having a longitudinal axis and further include an outer tubular member disposed coaxially of the longitudinal axis and having an end adapted to be slidably telescopically received at least partially over the inner tubular member. The coupling means includes a substantially-cylindrical spring housing having a base secured to the inner tubular member. The spring housing further has an outer substantially annular wall carried by the base and spaced radially from the inner tubular member substantially concentrically of the longitudinal axis thereof. A flange member is carried by the annular wall of the spring housing and extends therefrom radially inwardly thereof towards the inner tubular member, spaced therefrom, and substantially perpendicular to the longitudinal axis. An upwardly-inclined annular flange is formed on the end of the outer tubular member and is adapted to be received past the flange member and within the spring housing, when the outer tubular member is telescopically slidably received over the inner tubular member. The upwardly-inclined annular flange on the outer tubular member is arranged on an axis transverse to the flange member on the spring housing. A substantially annular spring is trapped within the spring housing and is arranged to be disposed between the flange member on the spring housing and the upwardly-inclined flange on the outer tubular member, thereby retaining the outer tubular member on the inner tubular member. With this arrangement, an implement may be inserted between the flange member and the outer tubular member and into the spring housing to displace the annular spring, thereby allowing the outer tubular member to be slidably removed from the inner tubular member.

In accordance with the further teachings of the present invention, the inner tubular member includes a first tube having an inner end and further having an annular radially-extending shoulder formed thereon and spaced from the end thereof. A second tube is secured over the end of the first tube and has an end bearing against the shoulder.

In accordance with the still further teachings of the present invention, the second tube has a pair of spaced-apart external annular grooves formed thereon beyond the end of the first tube. Respective sealing rings are carried by the grooves, and the outer tubular member has an inner diameter in sealing engagement with the respective rings axially beyond the spring housing.

In accordance with the yet still further teachings of the present invention, the base of the spring housing is secured on the end of the second tube axially adjacent to the annular shoulder on the first tube. Preferably, the annular spring is a garter spring. The annular wall of the spring housing has an end portion with an annular inner ledge formed therein, and the flange member is an annular washer press-fitted on the annular inner ledge of the spring housing.

These and other objects of the present invention will become apparent from a reading of the following specification, taken in conjunction with the enclosed drawings.

BRIEF DESCRIPTION OF THE DRAWINGS

FIG. 1 is a longitudinal section of the coupling means in partially assembled relationship.

FIG. 2 is a further longitudinal section of the coupling means, corresponding substantially to FIG. 2, but showing the coupling means in fully assembled relationship.

FIG. 3 corresponds to a portion of FIG. 2, but showing the annular garter spring expanded and displaced by a suitable implement (shown schematically in broken lines) to allow the inner and outer tubular members to be displaced axially relative to each other.

GENERAL DESCRIPTION OF THE PREFERRED EMBODIMENT

Figure 4:
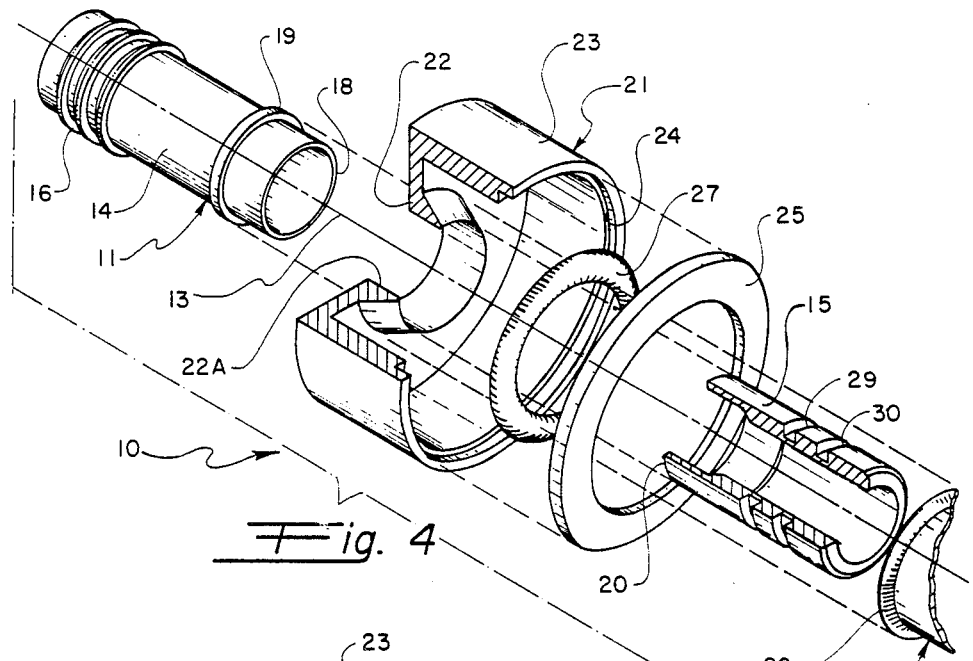
FIG. 4 is an exploded perspective of the major components of the coupling means of the present invention.
Figure 5:
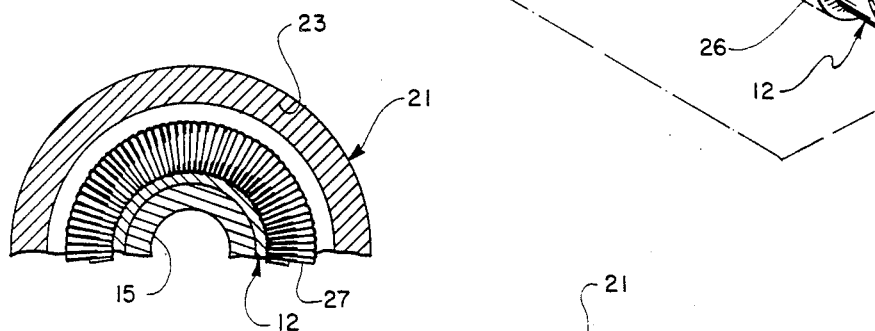
FIG. 5 is a section view taken across the lines 5—5 of FIG. 2.
Figure 6:
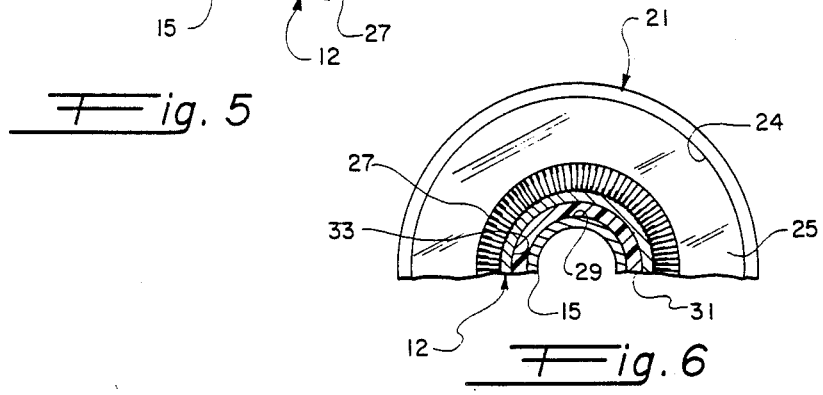
FIG. 6 is a further section view taken across the line 6—6 of FIG. 2.

With reference to the drawings, the coupling means 10 of present invention is adapted to removably retain an inner tubular member 11 to an outer tubular member 12 arranged coaxially about a longitudinal axis 13 (the latter being shown more clearly in FIG. 4). The inner tubular member includes a first tube 14 and a second tube 15. The first tube has plurality of spaced annular ribs 16 for retaining a hose 17. The hose may be laminated (if desired) and may be retained on the first tube by a suitable collar (not shown) tending to deform the hose. A similar hose (not shown) may be carried by the outer tubular member. The first tube further has an inner end 18 and is provided with a radially-extending annular shoulder 19 spaced from the end thereof. The second tube is secured over the end of the first tube and has an end 20 bearing against the annular shoulder. The second tube may be press-fitted on the first tube and may be brazed to prevent gas leakage.

A substantially-cylindrical spring housing 21 has a base 22 provided with a circular opening 22A secured over the end of the second tube and substantially axially adjacent the shoulder on the first tube. The spring housing may be press-fitted on to the second tube and also brazed thereto. The base is formed integrally with a substantially annular wall 23. The wall is arranged substantially concentrically of the longitudinal axis and is spaced radially outwardly from the second tube. The wall is formed with an inner annular ledge 24, and an annular washer flange 25 is press-fitted (or otherwise suitably secured) within the ledge. The washer extends radially inwardly therefrom towards the inner tubular member, spaced therefrom, and is substantially perpendicular to the longitudinal axis.

An upwardly-inclined annular flange 26 is formed on the end of the outer tubular member. The upwardly-inclined flange is adapted to be received past the annular washer flange (and within the spring housing) when the outer tubular member is telescopically slidably received over the inner tubular member. The upwardly-inclined flange on the outer tubular member is arranged on an axis which is transverse to the annular flange washer on the spring housing.

An annular garter spring 27 is trapped within the spring housing and is arranged to be disposed between the annular washer flange 25 and the upwardly-inclined flange 26 (as shown more clearly in FIG. 2) thereby retaining the outer tubular member 12 on the inner tubular member 11.

In operation, as shown more clearly in FIG. 3, a suitable implement 28 may be inserted between the annular washer flange 25 (on the spring housing) and the upwardly-inclined flange 26 (on the outer tubular member) to enlarge and displace the garter spring 27, thereby allowing the upwardly-inclined flange 26 to clear the annular washer flange 25, and thereby allowing the outer tubular member 12 to be slidably removed from the inner tubular member 11. If desired, the implement may be of the form shown in the aforesaid McWhethy '359 patent.

As shown more clearly in FIGS. 1, 2 and 4, the second tube of the inner tubular member is provided with a pair of axially-spaced external annular grooves 29 and 30. Respective sealing rings 31 and 32 are carried by the grooves, axially beyond the spring housing, and are in sealing engagement with the inner diameter 33 of the outer tubular member.

Thus, the present invention provides a rugged and reliable coupling means for tubular members which is economical to produce without the necessity for expensive metal-forming dies. The non-parallel arrangement between the cooperating annular flanges (25 and 26, respectively) provides a rigid coupling which removably retains the telescoping tubular members 11 and 12.

Obviously, many modifications may be made without departing from the basic spirit of the present invention. Accordingly, within the scope of the appended claims, the invention may be practiced other than specifically disclosed herein.

What is claimed is:

1. A coupling means for a pair of tubular members, comprising, in combination, an inner tubular member having a longitudinal axis, the inner tubular member including a first tube having an inner end and further having an annular radially-extending shoulder formed thereon and spaced from the end thereof, the inner tubular member further including a second tube press-fitted over the end of the first tube and having an end bearing against the shoulder, an outer tubular member disposed coaxially of the longitudinal axis and having an end adapted to be slidably telescopically received at least partially over the second tube of the inner tubular member, a substantially-cylindrical spring housing having a flanged base of substantially increased cross-section, said housing being press-fitted to the end of the second tube of the inner tubular member at a position substantially adjacent to the shoulder of the first tube, the spring housing further having an outer annular wall formed integrally with the base and spaced radially from the second tube of the inner tubular member substantially concentrically of the longitudinal axis thereof, the annular wall of the spring housing having an end portion with an annular inner ledge formed thereon, an annular washer flange press-fitted on the annular inner ledge and extending therefrom radially inwardly thereof towards the second tube of the first tubular member, spaced therefrom, and substantially perpendicularly to the longitudinal axis thereof, an upwardly-inclined annular flange on the end of the outer tubular member and adapted to be received past the annular washer flange and within the spring housing when the outer tubular member is telescopically slidably received over the second tube of the inner tubular member, the upwardly-inclined annular flange being arranged on an axis transverse to the annular washer flange, an annular garter spring trapped within the spring housing and arranged to be disposed between the annular washer flange and the upwardly-inclined annular flange on the outer tubular member, thereby retaining the outer tubular member on the inner tubular member, whereby the implement may be inserted between the annular washer flange and the outer tubular member and into the spring housing to displace the annular garter spring, thereby allowing the outer tubular member to be slidably removed from the second tube of the inner tubular member, the second tube having a pair of axially spaced-apart external annular grooves formed thereon beyond the end of the first tube, respective sealing rings carried by the grooves, and the outer tubular member having an inner diameter in sealing engagement with the respective rings outwardly of the spring housing.

* * * * *